United States Patent
Niaki et al.

(10) Patent No.: US 10,312,684 B2
(45) Date of Patent: Jun. 4, 2019

(54) SYSTEM AND METHOD FOR INTELLIGENT STATIC TRANSFER SWITCH WITH SMART HOME POWER MANAGEMENT

(71) Applicants: Seyed Ali Nabavi Niaki, Toronto (CA); Saeed Hassan Fard, East York (CA)

(72) Inventors: Seyed Ali Nabavi Niaki, Toronto (CA); Saeed Hassan Fard, East York (CA)

( * ) Notice: Subject to any disclaimer, the term of this patent is extended or adjusted under 35 U.S.C. 154(b) by 180 days.

(21) Appl. No.: 15/093,392

(22) Filed: Apr. 7, 2016

(65) Prior Publication Data
US 2017/0141610 A1    May 18, 2017

Related U.S. Application Data

(60) Provisional application No. 62/257,162, filed on Nov. 18, 2015.

(51) Int. Cl.
| | |
|---|---|
| H02J 3/14 | (2006.01) |
| H02J 3/38 | (2006.01) |
| H02J 9/06 | (2006.01) |
| H02J 13/00 | (2006.01) |

(52) U.S. Cl.
CPC .............. *H02J 3/14* (2013.01); *H02J 3/382* (2013.01); *H02J 9/062* (2013.01); *H02J 9/066* (2013.01); *H02J 13/0006* (2013.01); *H02J 3/383* (2013.01); *H02J 3/386* (2013.01)

(58) Field of Classification Search
CPC .................................. H02J 3/14; H02J 3/382
See application file for complete search history.

(56) References Cited

U.S. PATENT DOCUMENTS

| | | | | | |
|---|---|---|---|---|---|
| 5,157,291 | A * | 10/1992 | Shimoda | .............. | H03K 5/2472 327/408 |
| 6,455,954 | B1 * | 9/2002 | Dailey | .................... | H02J 9/062 307/43 |
| 6,876,103 | B2 * | 4/2005 | Radusewicz | .............. | H02J 9/06 307/125 |
| 7,256,568 | B2 * | 8/2007 | Lam | ........................ | H02M 1/10 323/222 |
| 7,498,694 | B2 * | 3/2009 | Luo | ........................ | H02J 7/0055 307/43 |
| 7,561,977 | B2 * | 7/2009 | Horst | ........................ | H02J 3/14 700/295 |
| 7,781,913 | B2 * | 8/2010 | Wang | ....................... | H02J 9/062 307/64 |
| 7,928,604 | B2 * | 4/2011 | Page | ........................ | H02J 9/06 307/64 |
| 9,081,568 | B1 * | 7/2015 | Ross | ....................... | G06F 1/3203 |
| 2002/0079741 | A1 * | 6/2002 | Anderson | ................. | H02J 9/08 307/64 |
| 2003/0042794 | A1 * | 3/2003 | Jarrett, Jr. | ................. | H02J 9/06 307/23 |

(Continued)

Primary Examiner — Thienvu V Tran
Assistant Examiner — Pinping Sun
(74) Attorney, Agent, or Firm — Christopher M. Ramsey; GrayRobinson, P.A.

(57) ABSTRACT

Systems and methods for intelligent transfer and management of power maintain a continuous and cost efficient supply of power to electrical loads in a residential or commercial unit when different energy resources such as utility, backup generators, energy storage systems and distributed energy resources (e.g. solar and wind) are available.

19 Claims, 4 Drawing Sheets

(56) References Cited

U.S. PATENT DOCUMENTS

| | | | | |
|---|---|---|---|---|
| 2004/0262997 | A1* | 12/2004 | Gull | H02J 3/005 307/64 |
| 2005/0200205 | A1* | 9/2005 | Winn | H02J 9/062 307/64 |
| 2006/0220462 | A1* | 10/2006 | O'Leary | H02J 9/062 307/44 |
| 2008/0294472 | A1* | 11/2008 | Yamada | G06Q 30/02 705/7.35 |
| 2009/0150100 | A1* | 6/2009 | Pifer | H02J 9/06 702/62 |
| 2013/0082529 | A1* | 4/2013 | Wolter | H02J 3/005 307/46 |
| 2013/0170105 | A1* | 7/2013 | Crawford | G01R 21/00 361/659 |
| 2013/0285453 | A1* | 10/2013 | Hurst | H02J 3/06 307/51 |
| 2014/0015324 | A1* | 1/2014 | Brennan | H02J 3/383 307/72 |
| 2014/0097680 | A1* | 4/2014 | Navarro | H02J 9/06 307/23 |
| 2014/0111006 | A1* | 4/2014 | Baldassarre | H02J 9/002 307/23 |
| 2014/0246908 | A1* | 9/2014 | Chew | H02M 3/156 307/24 |
| 2015/0123478 | A1* | 5/2015 | Murano | H02J 1/10 307/53 |
| 2016/0226235 | A1* | 8/2016 | Lathrop | H02H 3/08 |
| 2017/0264097 | A1* | 9/2017 | Pancheri | H02J 3/14 |

* cited by examiner

SYSTEM AND METHOD FOR INTELLIGENT STATIC TRANSFER SWITCH WITH SMART HOME POWER MANAGEMENT

CROSS-REFERENCE TO RELATED APPLICATION

This application claims the benefit of U.S. Provisional Application No. 62/257,162, having filing date of Nov. 18, 2015, the disclosure of which is hereby incorporated by reference in its entirety and commonly owned.

FIELD OF INVENTION

The embodiments described herein relate generally to the technical field of supplying electric power to a home or office with different energy sources. More particularly, the embodiments relate to intelligent management and transfer switching that continuously supplies power in a seamless and efficient manner.

BACKGROUND

As is well known in the art, studies show that about 62% of power outages in North America are weather related and 22% are caused by utility equipment failure. In addition to cost due to power and equipment failures, the price of producing electricity increases every year. Smart meters are now in place in order to monitor usage at any moment of time and pass the higher price of electricity during high demand times to consumers. Therefore end users, e.g. residential homes and businesses, are looking for solutions that could provide them with a reliable (uninterrupted) electric power and at lower prices. Availability of the small-scale Distributed Energy Resources (DER) and Energy Storage Systems (ESS) for home applications has introduced a new concept of Smart Home where the consumers can easily be able to make intelligent energy choices of their interest. For example, the U.S. Pat. No. 4,644,320 and patent application 2003/0050737 disclose home energy control systems to minimize the cost of energy in a smart home application.

A common practice to supply power to a home in case of a utility failure is using a Backup Generator (BG). To transfer home loads to a BG, two main technologies currently exist: 1—using a high capacity transfer switch at the main entrance; and 2—using several low capacity transfer switches that connect some essential loads to the BG. In the first approach, all the home loads are supplied by a high capacity backup generator. The size of the BG, in this approach, must be the same size of the total loads of the home. In the second approach, only a small size generator is used to supply some essential loads only, at the user's discretion. As an example, the U.S. Pat. No. 8,766,489 provides a solution based on using a transfer switch to connect backup generators to supply power to home loads in case of a utility outage.

The existing transfer switches are mostly mechanical. They may be operated either manually or automatically. The minimum transfer time between the utility and BG is typically about 1 minute. Therefore, there is always a disruption. Also, none of the existing technologies can accommodate automatic switching between different energy sources in a seamless manner.

The present invention provides a solution for the above-mentioned shortcomings. Intelligent transfer switching can maintain continuous supply of energy to a building from various sources of energy. In this approach, one or more of backup generators, energy storage systems and distributed energy resources (e.g. solar and wind) may be available to an end user, in addition to the main power utility. Furthermore, an intelligent power management system may be utilized to balance supply of power between the main utility and other energy sources in accordance with price of electricity in real-time in order to minimize consumption costs.

SUMMARY

Embodiments of the invention described herein provide in one aspect, a system for automatic management of supply and distribution of electric power, the system comprising: a load management switches unit configured to control supply of power to a plurality of loads; a main transfer switch unit configured to control input power received from a plurality of energy resources, and to supply power to the load management switches; and a monitoring and power management unit communicating with the main transfer switch unit and the load management switches unit; wherein the monitoring and power management unit monitors load information and system information signals received from the main transfer switch unit and the load management switches unit, and accordingly provides control signals for the main transfer switch unit and the load management switches unit.

The embodiments described herein provide in another aspect a method for automatic management of supply and distribution of electric power, the method comprising: monitoring load information and system information signals received from a load management switches unit and from a main transfer switch unit; and providing control signals for the main transfer switch unit and for the load management switches unit according to the load and system information; wherein the load management switches unit is configured to control supply of power to a plurality of loads; and the main transfer switch unit is configured to control input power received from a plurality of energy resources and to supply power to the load management switches unit.

The embodiments described herein provide in another aspect a programmable power management apparatus comprising a microprocessor, the apparatus configured to: monitor load information and system information signals received from a load management switches unit and from a main transfer switch unit; and provide control signals for the main transfer switch unit and for the load management switches unit according to the load and system information; wherein the load management switches unit is configured to control supply of power to a plurality of loads, and wherein the main transfer switch unit is configured to control input power from a plurality of energy resources and to supply power to the load management switches unit.

BRIEF DESCRIPTION OF DRAWINGS

For a better understanding of the embodiments and/or related implementations described herein and to show more clearly how they may be carried into effect, reference will now be made, by way of example only, to the accompanying drawings which show at least one exemplary embodiment and/or related implementation in which.

Figure 1:
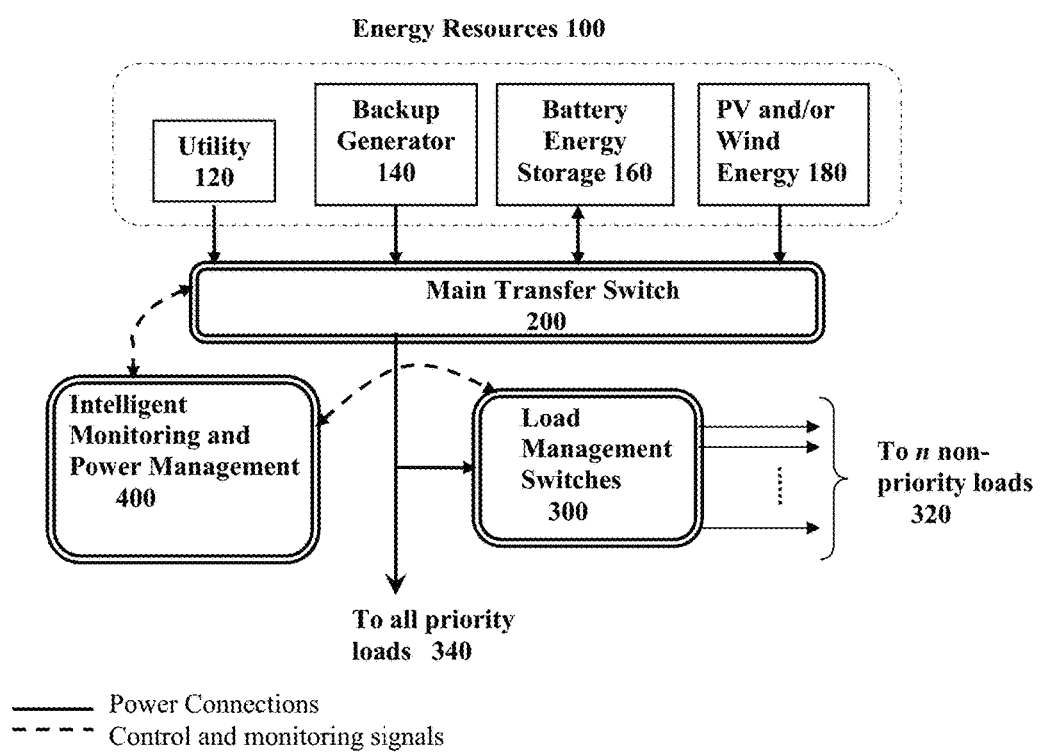
FIG. 1 illustrates a top level diagram of an embodied power supply and distribution system.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE EMBODIMENTS

Embodiments of the present invention will now be described more fully hereinafter with reference to the accompanying drawings, in which the embodiments of the invention are shown by way of illustration and example. This invention may, however, be embodied in many forms and should not be construed as limited to the embodiments set forth herein. Rather, these embodiments are provided so that this disclosure will be thorough and complete, and will fully convey the scope of the invention to those skilled in the art. Like numerals refer to like elements.

It will be appreciated that numerous specific details are set forth in order to provide a thorough understanding of the exemplary embodiments described herein.

However, it will be understood by those of ordinary skill in the art that the embodiments and/or implementations described herein may be practiced without these specific details. In other instances, well-known methods, procedures and components have not been described in detail so as not to obscure the embodiments and/or implementations described herein. Furthermore, this description is not to be considered as limiting the scope of the embodiments described herein, but rather to describe the structure and operation of the various embodiments and/or implementations described herein.

FIG. 1 illustrates a top level diagram of an embodied power distribution management system. Accordingly, the system comprises a Main Transfer Switch unit 200; a Load Management Switches unit 300; and an Intelligent Monitoring and Power Management unit 400. In one embodiment, the switches in the system may be static AC switches (e.g. using SCR) that can get turned on/off by a command signal, where the transfer time between different sources is about ¼ cycle (4 msec). That meets the IEEE power quality standards (IEEE Standard for Interconnecting Distributed Resources with Electric Power Systems," in *IEEE Std* 1547-2003, vol., no., pp. 1-28, Jul. 28, 2003; and IEEE Recommended Practice for Monitoring Electric Power Quality," in *IEEE Std* 1159-2009 (*Revision of IEEE Std* 1159-1995), vol., no., pp. c1-81, Jun. 26, 2009) and comply with the CBEMA curve, as known in the art (e.g. see Kusko, A. and Thompson, M. (2007). *Power Quality in Electrical Systems*. New York: McGraw-Hill).

The main transfer switch 200 may be located between the main entrance switch (main breaker) and the main circuit breakers panel commonly installed in residential or commercial building units. As shown in FIG. 1, the main transfer switch 200 receives input power from a plurality of Energy Resources 100. The main transfer switch 200 may be configured to provide supply of power to the load management switches 300. The load management switches 300 controls operation of a plurality of non-priority (also referred to as low priority) loads 320. Optionally, the main transfer switch 200 may be configured to provide supply of power for a plurality of priority loads 340 in the unit directly.

The priority loads 340 are meant to be powered at all times, such as emergency signs and elevators in a building.

The energy resources 100 include the main electrical utility 120 supplied to the building. Additionally, the energy resources 100 may include at least one Backup Generator 140, at least one Battery Energy Storage 160, and one or more alternative sources of energy 180 such as a Photovoltaic (PV) and/or Wind Energy. It should be noted that the alternative energy resources 180 are not limited to PV and wind components that are shown in FIG. 1. The disclosed teachings are applicable to any existing or future source of energy that may be convertible to electric power, as will be appreciated by practitioners of the art.

It should also be noted that the flow of power between the main transfer switch 200 and the battery energy storage 160 is bi-directional, as shown in FIG. 1. That is, the main transfer switch 200 may be employed to charge the battery energy storage 160, normally through a battery charger, when required. In this configuration, the input power may be provided by the power utility 120, when the utility is available. Alternatively, the input power may be provided by the backup generator 140 and/or the alternative sources 180, when the utility is unavailable. In one example, the system may be programmed to charge the battery with the utility 140 power during off-peak times and using cheaper electricity. In another example, the system may be programmed to charge the battery with the power from the backup generator 140 during a power outage, and when non-priority loads are not in use.

The load management switches 300 may be located after the main circuit breakers. The load management switches 300 may connect/disconnect low priority loads 320, for example, during the operation of the backup generator 140 or the battery 160. In one embodiment, the load management switches 300 comprise static AC switches.

The intelligent monitoring and power management unit 400 continuously monitors, via wired or wireless connections, the load currents/voltages in the main transfer switch 200 and the load management switches 300 to ensure that the power is efficiently provided to the priority loads 340 all the time and to the non-priority loads 320 when required.

Figure 2:
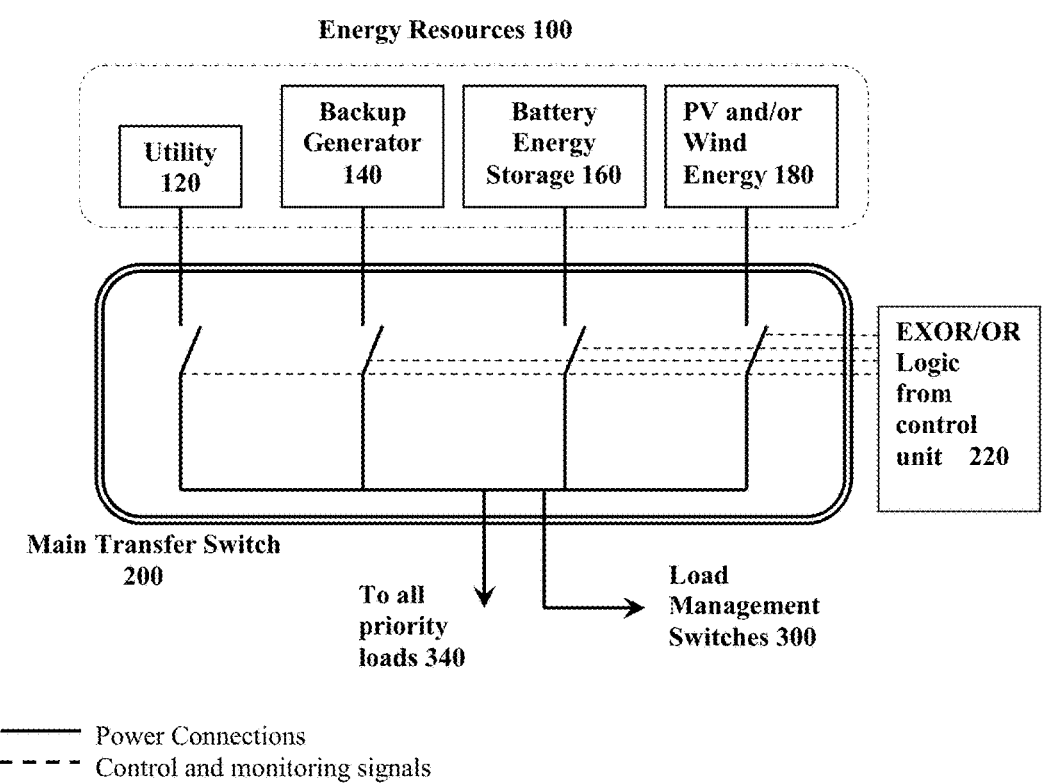
FIG. 2 illustrates an exemplary main transfer switch unit, as embodied in the invention.

FIG. 2 is an exemplary schematic of the main transfer switch 200 in relation with the other components of the system. It comprises n number of switches, preferably static AC switches, where n is the number of all the available sources of power to a building unit, including the main utility 120. Two modes of operations may be implemented for the main transfer switch 200, as illustrated in FIG. 2: 1—the loads may be connected to the utility 120 and to other (non-utility) energy sources of 100 with (exclusive or) EXOR logic; and 2—the loads may be connected to the utility 120 and to other (non-utility) energy sources of 100 with OR logic.

In one embodiment, the EXOR mode of operation may be adapted, where the main transfer switch 200 facilitates the power transfer from the utility 120 to other sources 140-180 in a fully automated manner. An example of this mode of operation is a power outage when the utility 120 would be unavailable.

In another embodiment, the OR logic operation may be adapted, where the loads may be connected either to the utility 120 or to the other sources 140-180, or to both the utility 120 and the other sources 140-180 at the same time. For example, this mode of operation may be adapted to reduce the cost of power consumption during peak hours by reducing supply from the utility 120 and extracting the needed power from the other sources 140-180 instead.

Figure 3:
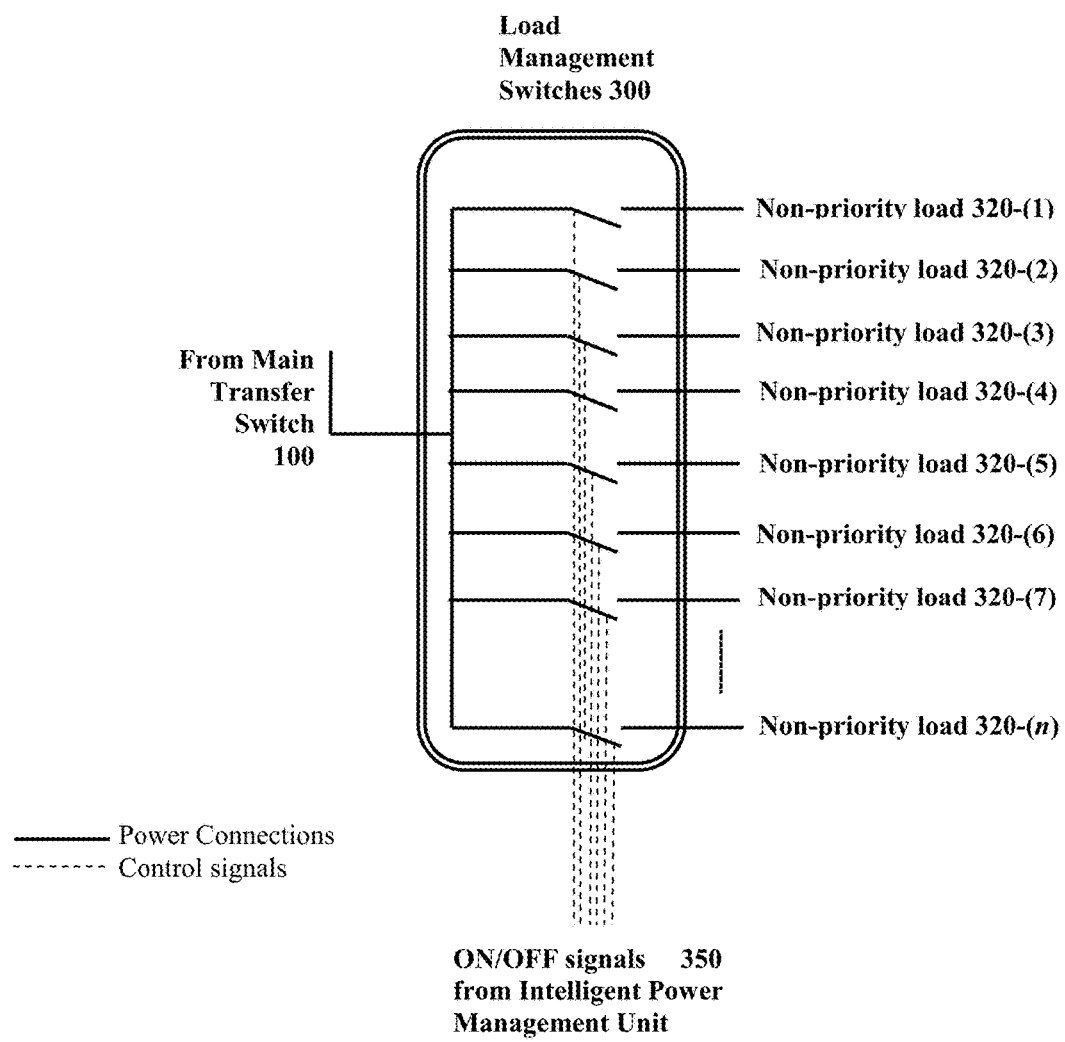
FIG. 3 illustrates an exemplary load management switches unit as embodied in the invention.

An exemplary architecture of the load management switches unit 300 is illustrated in FIG. 3. The load management switches unit 300 may be located after the main circuit breakers. Its primary function is to connect/disconnect low priority loads 320-(1) to 320-(n). For example, during the operation of the backup generator 140 some or all these loads may be disconnected in order to keep the priority loads 340 powered for a longer period of time. The load management switches unit 300 receives proper control signals, e.g. on/off signals 350, from the intelligent monitoring and power management unit 400.

Figure 4:
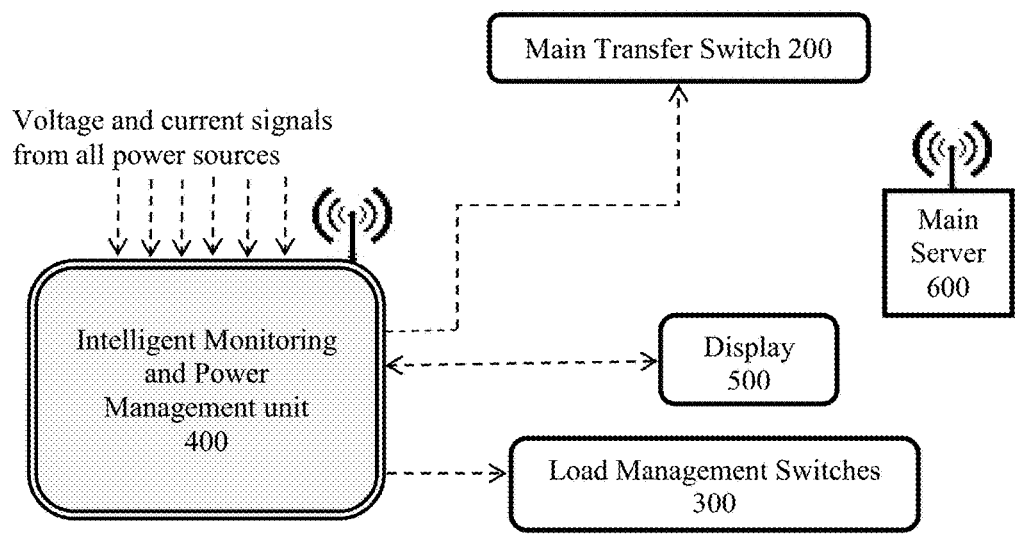
FIG. 4 illustrates an exemplary intelligent monitoring and power management system, as embodied in the invention.

FIG. 4 illustrates one embodiment of the invention, where the intelligent monitoring and power management unit 400 is shown in constant communication with other components of the system. The monitoring and power management unit 400, being the brain of the system, may comprise a microprocessor. It keeps monitoring the load currents/voltages and provides power for the priority loads 340 all the time. The voltage and current signals of all energy sources are measured and sent to the intelligent power management unit 400 for the sake of monitoring and power management. Other information such as outside temperature, temperature of components of the system, date, time, etc. may also be gathered by the intelligent monitoring and power management unit 400. Based on the information from the system conditions, intelligent logics determine the proper control signals for the main transfer switch unit 200 and load management switches unit 300. The proper control signals may be, but are not limited to, on/off signals 350. Varying voltages/currents, phase control and pulse control are other examples of control signals.

In one embodiment, the intelligent monitoring and power management unit 400 sends and receives all the system information to a main server 600 wirelessly, for the sake of system maintenance and continuous monitoring and event logging, in addition to wirelessly communicating with the main transfer switch 200 and the load management switches 300. Accordingly, all system components may be equipped with wireless communication means. This capability may in turn be utilized in remote control and operation of the system, for example via the internet, smart phone applications, etc. The main server 600 may be locally suited in the building or may be located externally, for instance with a service provider.

The monitoring and power management unit 400 may be programmed by a user or a technician for a fully automated control and management of power by the unit 400. In one embodiment, instructions may be uploaded to the unit 400 via a Graphic User Interface (GUI) application on a personal computer. In another embodiment, instructions may be uploaded to the unit 400 remotely by a service provider.

The intelligent monitoring and control provides end users with flexible methods of power management. According to an exemplary embodiment, if the consumption of the priority loads 340 and non-priority loads 320 exceeds the capacity of the back-up resources during a power outage, the intelligent power management unit 400 may decide to shift powering of all or a portion of the non-priority loads 320 to another time.

According to another exemplary embodiment, the consumption of energy during peak hours or peak usage may be redistributed among one or more of non-utility energy sources in addition to the utility 120. For example, the intelligent monitoring and power management unit 400 may shift a portion of the input energy supplied by the main utility 120 to one or more of the backup generator 140, battery energy storage 160 or the alternative sources 180. Such a multi-switching redistribution method would directly result in a considerable price reduction and savings. In fact, it may be performed in real-time in accordance with a time-of-use pricing instruction. Other factors, such as time of day, may come into consideration too. For instance, using a quiet battery would be more proper than using a noisy backup generator during late night or early morning hours.

In one embodiment, the system includes a Display unit 500. All major information, the system condition, and operation of each energy source may be shown on the display unit 500. The display unit 500 may be a touch screen type with a multi-page capability for user interactions. Changing the settings and the modes of operations can also be achieved through the control page of the display unit 500.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

Although the invention has been described relative to various selected embodiments herein presented by way of example, there are numerous variations and modifications that will be readily apparent to those skilled in the art in light of the above teachings. It is therefore to be understood that, within the scope of the claims hereto attached and supported by this specification, the invention may be practiced other than as specifically described.

That which is claimed is:

1. A system for automatic management of supply and distribution of electric power, the system comprising:

a main transfer switch unit connected to a plurality of energy resources via a corresponding plurality of switches, and configured to control input power received from the plurality of energy resources, and to supply power to a load management switches unit according to a first plurality of control signals;

the load management switches unit, receiving power from the main transfer switch unit, and configured to control supply of power to a plurality of loads according to a second plurality of control signals; and a monitoring and power management unit communicating with the main transfer switch unit and the load management switches unit, wherein the monitoring and power management unit monitors load information and system information signals received from the load management switches unit and from the main transfer switch unit, and accordingly provides control signals for the main transfer switch unit and the second plurality of control signals for the load management switches unit in such a way that the electric power is seamlessly supplied to the main transfer switch unit and the plurality of loads;

wherein the main transfer switch unit is configured to couple to a power utility and to at least one energy resource selected from a backup generator, a battery, and an alternative energy source, with an EXOR logic mode and with OR logic mode;

wherein, in EXOR logic mode, the main transfer switch unit is configured to transfer power from the power utility to the at least one energy resource when there is a power outage in the power utility; and wherein, in OR logic mode, the main transfer switch unit is configured to transfer power to the plurality of loads from both the power utility and the at least one energy resource for reducing a cost of power consumption from the power utility.

2. The system of claim 1, wherein at least one of the load management switches unit and the main transfer switch unit comprises a plurality of static AC switches.

3. The system of claim 1, wherein the main transfer switch unit is configured to supply power to a plurality of priority loads.

4. The system of claim 1, wherein the plurality of energy resources includes at least one battery.

5. The system of claim 1, wherein the main transfer switch unit is configured to charge at least one battery using input power from at least one of the power utility, the backup generator and the alternative energy source.

6. The system of claim 1, wherein the main transfer switch unit is configured to couple to the power utility and to one or more of at least one backup generator, at least one battery, and at least one alternative energy source.

7. The system of claim 1, further comprising a user interactive display unit.

8. The system of claim 1, wherein the monitoring and power management unit is configured to communicate with at least one of the main transfer switch unit and the load management switches unit via a wireless communication means.

9. The system of claim 1, wherein the monitoring and power management unit is configured to send the system information and the load information to a server and receive the system and load information from the server.

10. A method for automatic management of supply and distribution of electric power, the method comprising:
monitoring load information and system information signals received from a load management switches unit and from a main transfer switch unit, the main transfer switch unit being connected to a plurality of energy resources via a corresponding plurality of switches, the load management switches unit receiving power from the main transfer switch unit; and
providing control signals for the main transfer switch unit and for the load management switches unit according to the load and system information, wherein the load management switches unit is configured to control supply of power to a plurality of loads according to a second plurality of control signals, and wherein the main transfer switch unit is configured to control input power received from the plurality of energy resources and to supply power to the load management switches unit according to a first plurality of control signals;
wherein a monitoring and power management unit monitors load information and system information signals received from the load management switches unit and from the main transfer switch unit, and accordingly provides control signals for the main transfer switch unit and the second plurality of control signals for the load management switches unit in such a way that electric power is seamlessly supplied to the main transfer switch unit and the plurality of loads;
wherein the main transfer switch unit is configured to couple to a power utility and to at least one energy resource selected from a backup generator, a battery, and an alternative energy source, with an EXOR logic mode and with OR logic mode;
wherein, in EXOR logic mode, the main transfer switch unit is configured to transfer power from the power utility to the at least one energy resource when there is a power outage in the power utility; and
wherein, in OR logic mode, the main transfer switch unit is configured to transfer power to the plurality of loads from both the power utility and the at least one energy resource for reducing a cost of power consumption from the power utility.

11. The method of claim 10, wherein the main transfer switch unit is configured to supply power to a plurality of priority loads.

12. The method of claim 10, wherein the plurality of energy resources includes at least one battery.

13. The method of claim 12, wherein the main transfer switch unit is configured to charge the at least one battery using input power from at least one of the power utility, the backup generator and the alternative energy source.

14. The method of claim 10, wherein the main transfer switch unit is configured to switch to at least one of the backup generator, the battery and the alternative energy source, for supply of input power during the power outage.

15. The method of claim 10, wherein the main transfer switch unit is configured to reduce receive of input power from the power utility and increase receive of input power from at least one of the backup generator, the battery and the alternative energy source.

16. The method of claim 10, wherein the monitoring and power management unit communicates with at least one of the main transfer switch unit and the load management switches unit via a wireless communication means.

17. a programmable power management apparatus comprising a microprocessor, the apparatus configured to:
monitor load information and system information signals received from a load management switches unit and from a main transfer switch unit the main transfer switch unit being connected to a plurality of energy resources via a corresponding plurality of switches, the load management switches unit receiving power from the main transfer switch unit; and
provide control signals for the main transfer switch unit and for the load management switches unit according to the load and system information,
wherein the load management switches unit is configured to control supply of power to a plurality of loads according to a second plurality of control signals, and wherein the main transfer switch unit is configured to control input power from the plurality of energy resources and to supply power to the load management switches unit according to a first plurality of control signals;
wherein a monitoring and power management unit is configured to monitor load information and system information signals received from the load management switches unit and from the main transfer switch unit, and accordingly provide control signals for the main transfer switch unit and the second plurality of control signals for the load management switches unit in such a way that electric power is seamlessly supplied to the main transfer switch unit and the plurality of loads;
wherein the main transfer switch unit is configured to couple to a power utility and to at least one energy resource selected from a backup generator, a battery, and an alternative energy source, with an EXOR logic mode and with OR logic mode;
wherein, in EXOR logic mode, the main transfer switch unit is configured to transfer power from the power utility to the at least one energy resource when there is a power outage in the power utility; and wherein, in OR logic mode, the main transfer switch unit is configured to transfer power to the plurality of loads from both the power utility and the at least one energy resource for reducing a cost of power consumption from the power utility.

18. The apparatus of claim 17, wherein the apparatus is configured to communicate with at least one of the main transfer switch unit and the load management switches unit via a wireless communication means.

19. The apparatus of claim 17, wherein the apparatus is configured to send the system information and the load information to a server and receive the system information and load information from the server.

* * * * *